US008856260B2

(12) United States Patent  
Burkhardt et al.

(10) Patent No.: US 8,856,260 B2  
(45) Date of Patent: Oct. 7, 2014

(54) PROVIDING ACCESS TO SHARED STATE DATA

(75) Inventors: John R. Burkhardt, Arlington, MA (US); Ransom Richardson, Beverly, MA (US); Jason Schleifer, Cambridge, MA (US); Steven Lees, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 400 days.

(21) Appl. No.: 13/159,953

(22) Filed: Jun. 14, 2011

(65) Prior Publication Data

US 2012/0324034 A1    Dec. 20, 2012

(51) Int. Cl.  
*G06F 15/167*    (2006.01)  
*G06F 17/30*    (2006.01)

(52) U.S. Cl.  
CPC ............................. *G06F 17/30876* (2013.01)  
USPC .......................................... 709/212; 709/223

(58) Field of Classification Search  
None  
See application file for complete search history.

(56) References Cited

U.S. PATENT DOCUMENTS

| | | | |
|---|---|---|---|
| 5,928,323 A | 7/1999 | Gosling et al. | |
| 6,763,395 B1 | 7/2004 | Austin | |
| 6,990,514 B1* | 1/2006 | Dodrill et al. | 709/206 |
| 7,069,297 B2 | 6/2006 | Kimura et al. | |
| 7,774,380 B2* | 8/2010 | Burke et al. | 707/803 |
| 8,041,572 B2* | 10/2011 | Da Palma et al. | 704/270 |
| 8,073,887 B2* | 12/2011 | Baldwin et al. | 715/235 |
| 8,086,460 B2* | 12/2011 | Da Palma et al. | 704/270.1 |
| 8,132,113 B2* | 3/2012 | Khan et al. | 715/762 |
| 8,285,681 B2* | 10/2012 | Prahlad et al. | 707/640 |
| 2003/0097410 A1 | 5/2003 | Atkins et al. | |
| 2006/0020681 A1 | 1/2006 | DePree | |
| 2008/0288609 A1 | 11/2008 | Pramberger | |
| 2009/0164485 A1* | 6/2009 | Burke et al. | 707/100 |
| 2009/0240698 A1* | 9/2009 | Shukla et al. | 707/10 |
| 2009/0240728 A1* | 9/2009 | Shukla et al. | 707/103 R |
| 2009/0240935 A1* | 9/2009 | Shukla | 713/100 |
| 2011/0023017 A1 | 1/2011 | Calvin | |
| 2011/0137986 A1* | 6/2011 | Wolf | 709/204 |
| 2011/0289126 A1* | 11/2011 | Aikas et al. | 707/827 |
| 2011/0302316 A1* | 12/2011 | Chou et al. | 709/228 |
| 2013/0124400 A1* | 5/2013 | Hawkett | 705/39 |

OTHER PUBLICATIONS

Gonzalez, et al., "Implementing a State-Based Application Using Web Objects in XML", In Proceedings of the 2007 OTM Confederated international conference on on the move to meaningful internet systems: CoopIS, DOA, ODBASE, GADA, 18 pages, IS—vol. Part I.  
Battle, et al., "Bridging the Semantic Web and Web 2.0 with Representational State Transfer (REST)", In Journal Web Semantics: Science, Services and Agents on the World Wide Web archive, vol. 6, Issue 1, Feb. 2008, 9 pages.

\* cited by examiner

*Primary Examiner* — Ninos Donabed  
(74) *Attorney, Agent, or Firm* — Aaron Chatterjee; Brian Haslam; Micky Minhas

(57) ABSTRACT

Methods, systems, and computer-readable media for manipulating in-memory data entities are provided. Embodiments of the present invention use a Representational State Transfer ("REST") web service to manipulate the in-memory data entities. In one embodiment, a "snap shot" is taken of the in-memory data entities at a point in time to create representations of the entities. A hierarchy of the representations is built. The hierarchy is used to make the entities addressable via a URI. Embodiments of the invention may then map the entity representations in the hierarchy to the entities. An embodiment of the invention uses handlers to process a REST style request addressed to an entity representation. The handler reads the command and determines whether the command is authorized for performance on the entity and performs that command, if appropriate.

17 Claims, 7 Drawing Sheets

PROVIDING ACCESS TO SHARED STATE DATA

BACKGROUND

With improved connectivity and access of computers and other devices to various networks, it has become commonplace for different programs, or clients, to share access to the same information, such as data objects. Sharing of data objects enables the sharing of information in real-time across multiple, disparate clients, such as machines that are running multiple pieces of technology. With the sharing of data objects comes the inevitable issue of access to the data objects, including who is allowed to modify the data and what modifications are allowed. In order to track the modifications, applications running on different machines maintain active communications sessions with a central machine that managers data truth and/or with other machines that are accessing the data.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention use a Representational State Transfer ("REST") web service to manipulate in-memory data entities. Natively, the in-memory data entities can not be manipulated with a REST style command, in part, because the entities are not addressable with a uniform resource identifier ("URI") due to the nature of the in-memory storage. Additionally, without embodiments of the present invention, the in-memory data entities that are actively involved in a data sharing service are not well suited for manipulation with a REST style command because entities states may be rapidly changing apart from the REST web service.

In one embodiment, a "snapshot" is taken of the in-memory data entities at a point in time to create representations of the entities. A hierarchy of the representations is built. The hierarchy is used to make the entities addressable via a URI that is addressed to the entity representations in the hierarchy. Example entities include namespaces, collections, objects, and properties.

An embodiment of the invention uses handlers to process a REST style request addressed to an entity representation. As used herein, handlers are specialized applications that process the REST style requests. Initially, one or more handlers follow the URI to the entity that corresponds to the addressed representation. The handler reads the command in the request and determines whether the command is authorized for performance on the entity. The authorization could be based on entity type. For example, rules can be created that specify that certain actions could be preformed on objects, but not collections. In addition, the entity may have changed states since the representation was created and the handler may determine that the action can't be taken due to the change in state.

BRIEF DESCRIPTION OF THE DRAWINGS

Embodiments of the invention are described in detail below with reference to the attached drawing figures, wherein.

DETAILED DESCRIPTION

Figure 1:
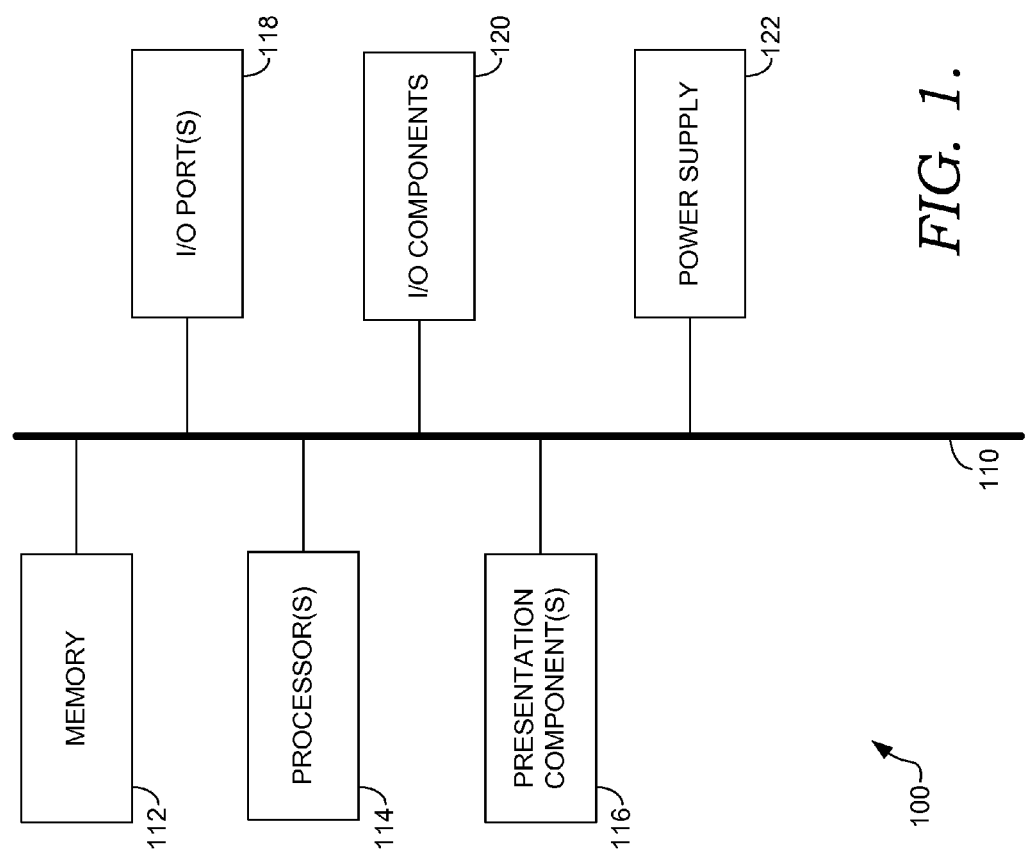
FIG. 1 is a block diagram of an exemplary computing environment suitable for implementing embodiments of the invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention use a Representational State Transfer ("REST") web service to manipulate in-memory data entities. Natively, the in-memory data entities can not be manipulated with a REST style command, in part, because the entities are not addressable with a uniform resource identifier ("URI") due to the nature of the in-memory storage. Additionally, without embodiments of the present invention, the in-memory data entities that are actively involved in a data sharing service are not well suited for manipulation with a REST style command because entities states may be rapidly changing apart from the REST web service.

In one embodiment, a "snap shot" is taken of the in-memory data entities at a point in time to create representations of the entities. A hierarchy of the representations is built. The hierarchy is used to make the entities addressable via a URI that is addressed to the entity representations in the hierarchy. Example entities include namespaces, collections, objects, and properties.

An embodiment of the invention uses handlers to process a REST style request addressed to an entity representation. As used herein, handlers are specialized applications that process the REST style requests. Initially, one or more handlers follow the URI to the entity that corresponds to the addressed representation. The handler reads the command in the request and determines whether the command is authorized for performance on the entity. These commands may be defined as part of the Hypertext Transfer Protocol ("HTTP") protocol (and REST design pattern) and include: POST, PUT, GET and DELETE which map to: Create, Read, Update and Delete—commonly referred to as CRUD. The authorization could be based on entity type. For example, rules can be created that specify that certain actions could be preformed on objects, but not collections. In addition, the entity may have changed states since the representation was created and the handler may determine that the action can't be taken due to the change in state.

Having briefly described an overview of embodiments of the invention, an exemplary operating environment suitable for use in implementing embodiments of the invention is described below.

Exemplary Operating Environment

Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks, or implements particular abstract data types. Embodiments of the invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120. Also, processors have memory. The inventors hereof recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and reference to "computer" or "computing device."

Computing device 100 typically includes a variety of computer-storage media. By way of example, and not limitation, computer-storage media may comprise Random Access Memory (RAM); Read Only Memory (ROM); Electronically Erasable Programmable Read Only Memory (EEPROM); flash memory or other memory technologies; Compact Disk Read-Only Memory (CDROM), digital versatile disks (DVDs) or other optical or holographic media; magnetic cassettes, magnetic tape, magnetic disk storage or other magnetic storage devices; or any other medium that can be used to encode desired information and be accessed by computing device 100. Computer-storage media may be nontransitory.

Memory 112 includes computer-storage media in the form of volatile and/or nonvolatile memory. The memory 112 may be removable, nonremovable, or a combination thereof. Exemplary memory includes solid-state memory, hard drives, optical-disc drives, etc. Computing device 100 includes one or more processors 114 that read data from various entities such as bus 110, memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components 120 include a microphone, joystick, game pad, satellite dish, scanner, printer, wireless device, etc.

Exemplary System Architecture

Figure 2:
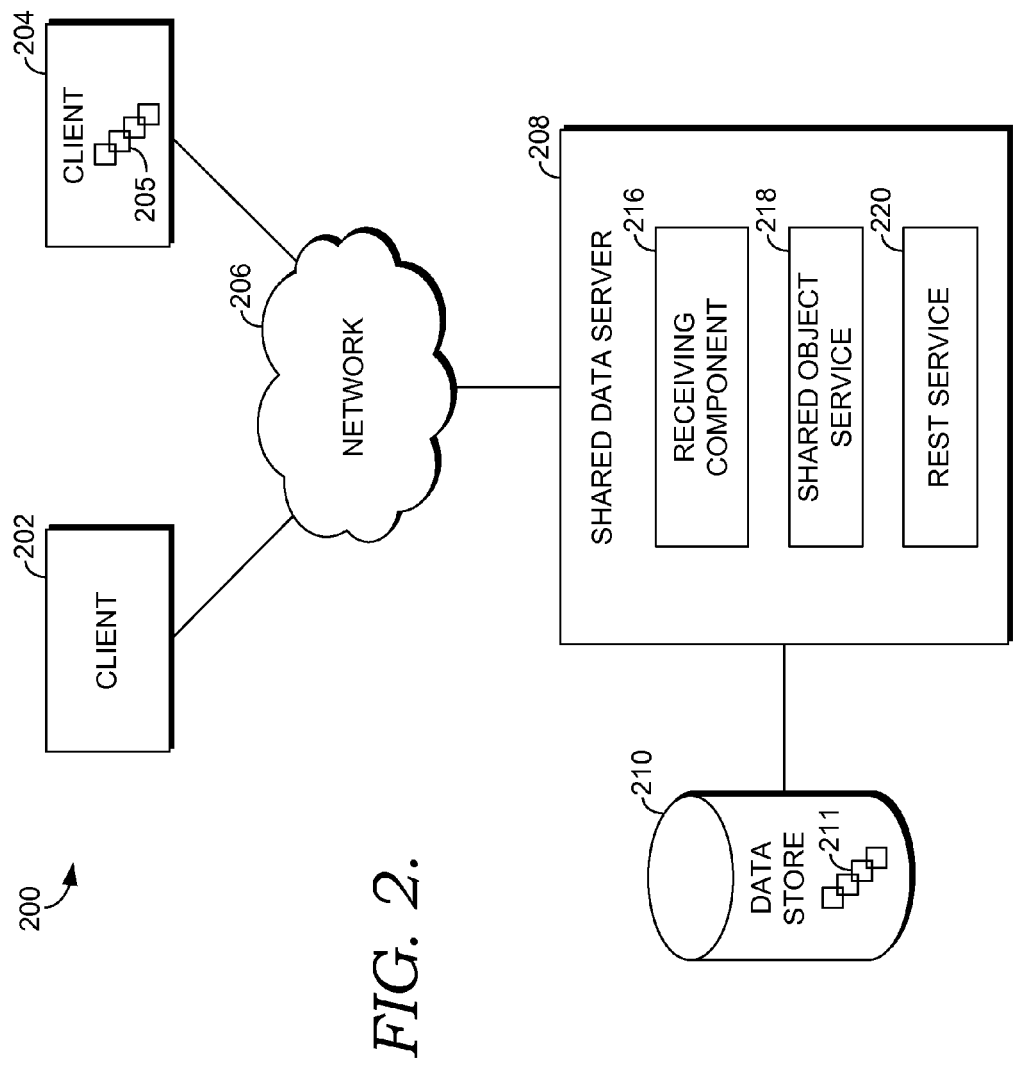
FIG. 2 is a diagram of a computing system architecture suitable for conducting auction simulations, in accordance with an embodiment of the present invention.

Referring now to FIG. 2, a block diagram is provided illustrating an exemplary computing system environment 200 suitable for use in implementing embodiments of the present invention. It will be understood and appreciated by those of ordinary skill in the art that the computing system environment 200 shown in FIG. 2 is merely an example of one suitable computing system environment and is not intended to suggest any limitation as to the scope of use or functionality of embodiments of the present invention. Neither should the computing system environment 200 be interpreted as having any dependency or requirement related to any single module/component or combination of modules/components illustrated therein.

The system environment 200 includes client devices 202 and 204, a shared data server 208, a data store 210, a receiving component 216, a shared-object service 218, and a REST service 220, all in communication with one another through a network 206. The network 206 may include, without limitation, one or more local area networks (LANs) and/or wide area networks (WANs) including the Internet. Such networking environments are commonplace. Accordingly, the network 206 is not further described herein.

In some embodiments, one or more of the illustrated components/modules may be implemented as stand-alone applications. In other embodiments, one or more of the illustrated components/modules may be integrated directly into other components. Further, components/modules may be located on any number of servers, client devices, or the like. By way of example only, the shared data server 208 might reside on a larger server, cluster of servers, or a computing device remote from one or more of the remaining components.

With continued reference to FIG. 2, each of client devices 202 and 204, and shared data server 208 may be any type of computing device, such as computing device 100 described with reference to FIG. 1. It should be understood that any number of client devices, servers, and data stores may be employed within the system environment 200 within the scope of the present invention. Each may comprise a single device or multiple devices cooperating in a distributed environment. For instance, the shared data server 208 may comprise multiple devices arranged in a distributed environment that collectively provide the functionality of the shared data server 208 described herein. Additionally, other components not shown may also be included within the system environment 200, while components shown in FIG. 2 may be omitted in some embodiments.

The client devices 202 and 204 may be any type of computing device owned and/or operated by a client that can access the network 206. For instance, each of the client devices 202 and 204 may be a desktop computer, a laptop computer, a tablet computer, a mobile device, or any other device having network access. Generally, a user may employ the client devices 202 and 204 to, among other things, attempt to open, delete, modify, etc., a data object stored on the shared data server 208. In one instance, the client device 202 attempts to access and modify a data object stored on the data store 210. As will be described herein, logic on the shared data server 208 may dictate whether this client is even allowed to open that data object, let alone make any modifications to it.

The shared data server 208 comprises various components, including a receiving component 216, the shared-object service 218, and the REST service 220. Generally, the receiving component 216 is configured to receive rule enforcement logic from a developer of an application, typically referred to as an originating client. Rule enforcement logic is logic that, in one embodiment, is provided by the developer of an application that may be used in conjunction with data objects. Instead of being stored by each developer individually, the rule enforcement logic may be stored by the system, such as on the shared data server 208 or the data store 210.

The receiving component 216 routes communications between client devices 202 and 204 and shared-object service 218 and REST service 220. As mentioned, the data within data store 210 may be manipulated through two different mechanisms. Accordingly, the receiving component 216 directs communications to the appropriate components. The receiving component 216 may maintain connections and manage communication sessions between the shared data server 208 and client devices 202 and 204.

The shared-object service 218 manages a shared-object model. The shared-object model comprises data entities 211. The data entries are shared between different applications, which may manipulate the entities 211. The entities 211 stored in data store 210 represents the "truth" of an entity, in the sense that differences between what the server copy says about the entity and what a local copy says about the entity may be resolved in favor of the server copy. The shared-object service 218 may manage concurrency and/or access controls on an object, property, collection, or namespace.

The shared-object service 218 propagates the truth of an entity to machines other than those that make up the shared data server 208. For example, client device 204 includes a local copy 205 of the entities 211. Applications on client device 204 directly interact with the local copy 205. A shared-object runtime on client device 204 notifies the shared-object service 218 of the change to entities that arise on the client device 204. The shared-object service 218 then changes the entities 211 to reflect the changes made in the machines. These changes may then be propagated to other devices that are currently accessing the entities 211.

If two machines make changes to an entity at the same time, conflict resolution rules may be used to resolve inconsistent changes to an entity. Once the truth of the entity is determined by shared-object service 218 the subscribing clients are notified of updates to the entity's state. If access controls had been set on the entity, then the current state of the entity is provided only to machines that are allowed to access the entity. Access control rules might be used to reject any updates from clients that don't have permission to write to the entity, to delete the entity, etc. When a client device receives a notification that the truth of the entity has changed, the shared-object runtime on each client device updates the client's local copy of the entity to match the truth of the entity. The notifications back and forth may be routed by receiving component 216.

The REST service 220 provides an alternative mechanism for modifying entities 211. The REST service 220 does not require that the client device maintain a local copy of an entity. Instead, the REST service uses Representational state transfer ("REST") style requests to modify the entities 211 and receives information about the states of the entities 211. REST is an application program style used in computing environments that include servers and clients. Clients may initiate requests to servers, servers process the request, and return appropriate responses. These requests (or commands) may be defined as part of the HTTP protocol (and REST design pattern) and include: POST, PUT, GET and DELETE which map to: Create, Read, Update and Delete—commonly referred to as CRUD. The REST service 220 receives these requests and processes them. As with the shared-object service 218, the REST service 220 may determine whether clients have access to an entity, and the type of access presented. Further, the REST service may allow different actions to be performed on different types of entities. The different types of actions allowed for different entities will be explained in more detail subsequently.

Figure 3:
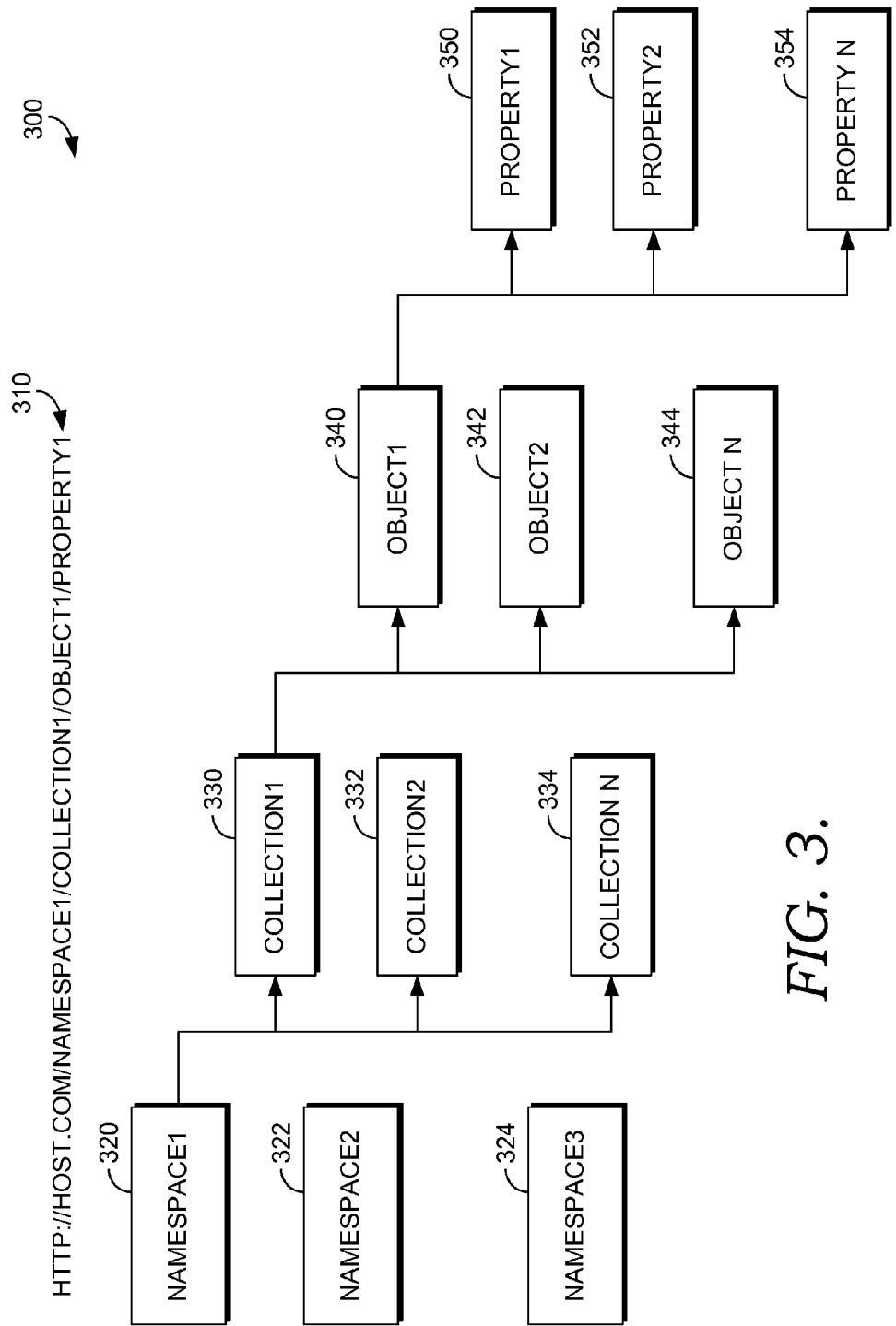
FIG. 3 is a diagram illustrating an entity hierarchy built from in-memory data entities, in accordance with an embodiment of the present invention.

In embodiments of the present invention, the data store maintains the entities 211 in an in-memory type of storage. Entities within the in-memory storage are not directly addressable by a URI because the entities do not maintain a fixed location or address within the in-memory storage. The hierarchy of entities can change so there are no fixed URI addressing schemes. REST type requests include a URI with an instruction to manipulate an entity associated with the URI. The REST service 220 builds a representation of the entities 211 that is addressable so that the REST type request can be processed to manipulate an entity. In one embodiment, the REST service 220 takes a "snapshot" of the state of each entity within entities 211 at a point in time to build entity representations. In one embodiment, the "point in time" is when a request is received. Representations of entities are then placed into an entity hierarchy. The hierarchy reflects relationships between the entities. For example, a namespace entity may be a root note. Collections within that namespace may be a subnode to the namespace, objects within a particular collection may be a subnode to a particular collection, and properties associated with an object may be subnodes under the object level. FIG. 3 is one example of such a hierarchy and the relationships between entities.

Embodiments of the present invention manipulate data entities within in-memory storage. Examples of the data entities include namespaces, collections, objects, and object properties. In order for different machines, applications, and application instances to share access to an object, they share a common namespace. That is, for all entities that will access a shared object, the same name refers to the same object. For example, a first namespace may contain names bob1, bob2, and bob3. If client devices 202 and 204 are to share access to bob1, then the name of that object (e.g., bob1) will have the same meaning on both client devices 202 and 204. One example of a namespace is an instance of a chat room.

Data objects, as used herein, refer to any entity that is able to be manipulated by commands of one or more programming languages, such as value, variable, function, or data structure. In software development, objects are used to implement abstract data structures by bringing together the data components with the procedures that manipulate them. An object stores its state in fields, or variables in some programming languages, and exposes its behavior through methods, or functions in some programming languages. Many instances of a particular object may exist, and thus these instances belong to a particular class, which is the blueprint from which individual objects are created. Once created, objects may be updated or modified by a number of clients. In one embodiment, a client attempts to perform an action (e.g., open, close, delete, modify) on a data object that has been opened using a particular application. As used herein, an application is computer software designed to assist a user to perform tasks, and as mentioned, may be used to open and modify various data objects, including documents. A chat entry is one example of an object that may be shared between clients.

An object may be a container for one or more properties. Properties can be modified and form a separate type of entity. The property may be defined independently of an object and then associated with one or more objects. A property is not a container for other entities.

A collection is a group of objects. Collections themselves implement a set of operations, such as adding and removing items from a collection. In the REST modeling, certain objects can act as "containers" which means they can support operations such as "Create" which would create a subordinate resource under the container. A collection and an object are examples of containers. Some examples of collections include lists, arrays, sets, bags, and various other groups of data. Some types of collections are ordered. That is, the current state of an ordered collection is defined not merely by the contents of the collection, but also by the order in which those contents appear. For example, {1, 2, 3, 4, 5} is a collection of data that contains the integers one through five, inclusive. If the collection is ordered, then {1, 2, 3, 4, 5} is a different state from {2, 4, 3, 1, 5} because these two states have different orders even though they both contain the same items. A list of chat entries is one example of a collection.

Turning now to FIG. 3, a representation hierarchy 300 that models entities within in-memory data is shown, in accordance with an embodiment of the present invention. Three namespace representations are shown on the first or root level: Namespace 1, 320, namespace 2, 322, and namespace 3, 324. Each namespace representation may be thought of as a root node. As shown, only namespace 1, 320, has subnodes. Namespace representations may have collections or objects as subnodes. The collection representations include collection 1, 330, collection 2, 332 and collection N, 334. Under collection 1, 330, three object representations are shown. The object representations include object 1, 340, object 2, 342, and object N, 344. Under object 1, 340, three property representations are shown. The property representations include property 1, 350, property 2, 352, and property N, 354.

URI 310 is addressed to an entity in the hierarchy 300. The URI 310 may be thought of as including five different segments. The first segment "host.com" identifies a particular set of shared entities. The second segment "namespace 1" identifies a namespace within the shared entities. In this case, "namespace 1" corresponds to namespace 1, 320. The third segment "collection 1" corresponds with collection 1, 330. The fourth segment corresponds with object 1, 340. The fifth segment, "property 1" corresponds with property 1, 350. Thus, a REST style request with the URI 310 is addressed to property 1 350 representation. Property 1, 350 can then be mapped to a property within the entities 211 by the REST service 220. Again, the representations in the hierarchy are not the actual entities, but instead provide a fixed address that the REST service uses to process a REST style request. As part of the processing, a representation may be mapped to a corresponding entity.

In one embodiment, handlers are invoked for each level of the hierarchy 300. For example, a handler, which is a specific application that processes REST requests, may handle all requests that are addressed to a namespace representation. Initially, upon receiving a request, the request may be sent to a handler associated with the root node of a hierarchy, in this case, namespaces. The handler determines whether the URI is addressed to a namespace representation. If the URI is not addressed to a namespace representation, then the namespace handler passes the request along to a handler associated with the hierarchal level below namespaces. In this case, the namespace handler would pass a request addressed to URI 310 to the collection handler. The collection handler would make a similar determination and pass the request addressed to URI 310 to the object handler. The object handler would similarly determine that the request addressed to URI 310 is not addressed to an object entity and pass the request to a property handler. The property handler would determine that the request addressed to URI 310 is addressed to a property representation. Further the property handler would recognize that the request is addressed to property 1, 350. The property handler would then perform the instruction specified in the request after validating that the instruction should be performed.

Figure 4:
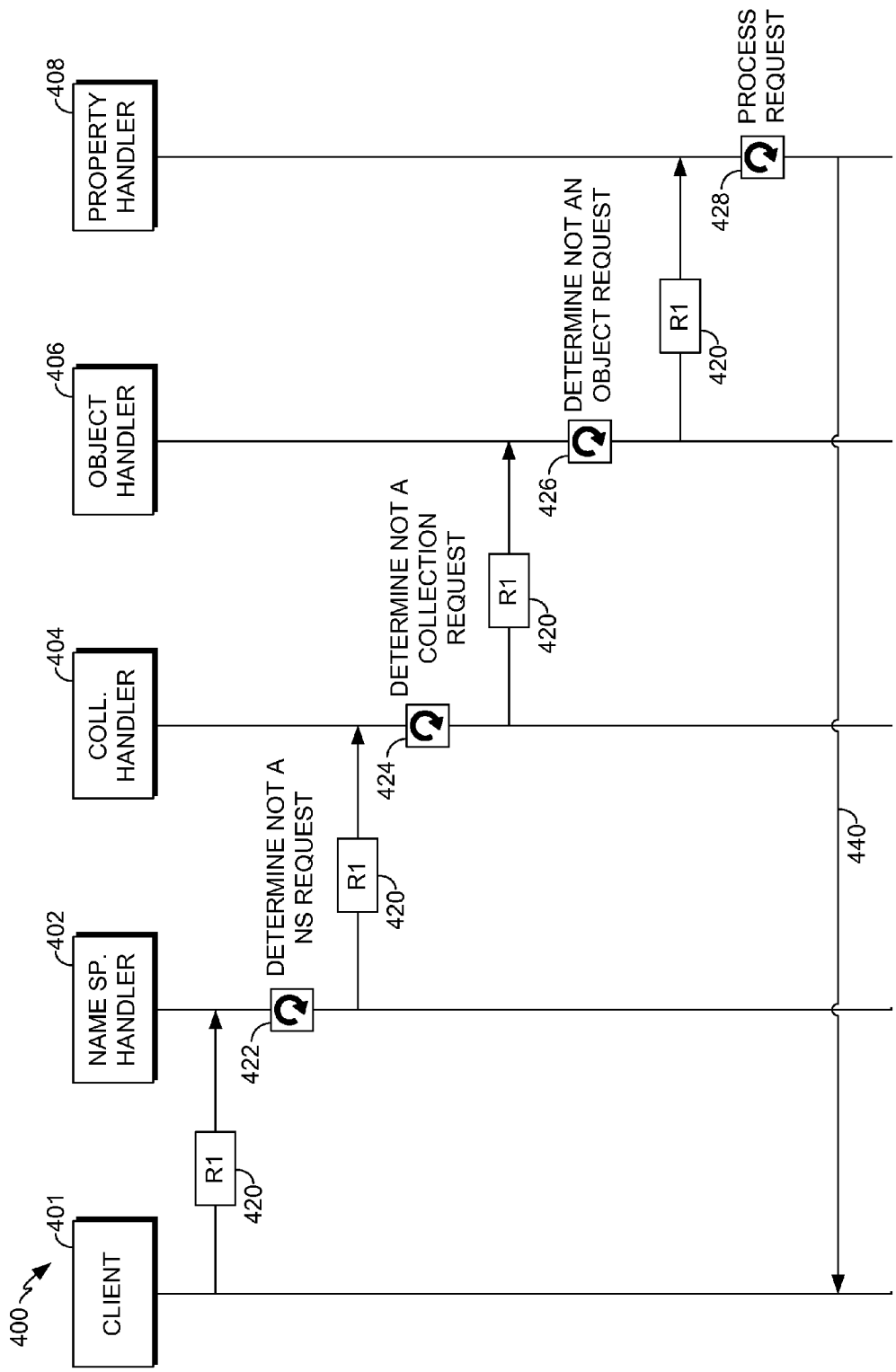
FIG. 4 is a diagram illustrating handling a request, in accordance with an embodiment of the present invention.

Turning now to FIG. 4, communications occurring during the handling of requests are shown, in accordance with an embodiment of the present invention. The computing environment 400 in FIG. 4 includes a client device 401, that may be similar to client device 202 described previously with reference to FIG. 2. Computing environment 400 also includes a namespace handler 402, a collection handler 404, an object handler 406, and a property handler 408. The handlers 402, 404, 406, and 408 may be associated with a component similar to the REST service 220 described previously.

Initially, a request 420 is communicated from the client device 401 to the namespace handler 402. In an actual embodiment, there may be several intermediate components such as receiving component 216 in between the client device 401 and the namespace handler 402. Those components are not shown as the primary purpose of FIG. 4 is to illustrate how the handlers 402, 404, 406, and 408 process a request.

The namespace handler 402 initially determines 422 that the request 420 does not include a URI that is addressed to a representation of a namespace. For example, URI 310 (in FIG. 3) is not addressed to a namespace because it includes additional segments that are below a namespace. Having determined 422 that the request 420 is not addressed to a namespace representation, the namespace handler 402 communicates the request 420 to the collection handler 404, which is associated with representations of collections. The collection handler 404 similarly determines 424 that the request 420 is not addressed to a collection representation. The collection handler 404 then passes the request 420 to the object handler 406. The object handler 406 determines 426 that the request 420 is not addressed to an object representation either. Finally, the object handler 406 communicates the request 420 to a property handler 408.

The property handler 408 determines 428 that the request 420 is addressed to a representation of a property. The property handler 408 then maps the representation of the property to the corresponding property within the in-memory storage. The instruction associated with the request 420 is then processed. For example, the request 420 may be a GET request to retrieve the current value of a property. In this case, the property handler 408 retrieves the current state of the property associated with the property representation indicated in the URI within request 420 and communicates a response 440 back to the client device 401. Other types of requests that may be received include a POST request, a PUT request, and a DELTE request. A POST-request would not be appropriate for properties in this case because there is no subordinate resource for properties.

In FIG. 4, specific handlers have management responsibility for specific hierarchical levels or entities. Embodiments of the present invention are not limited to dedicated handlers. Further, embodiments are not limited to four hierarchical levels. More generally, a handler with management responsibility for a URI segment inspects the current portion of the URI segment and if there are no remaining segments then it handles the request. If there are remaining segments, then it looks at its "children" and passes the URI to them. That is, to a child URI handler. In this way, the abstract URI handler is extensible to any kind of hierarchy.

Figure 5:
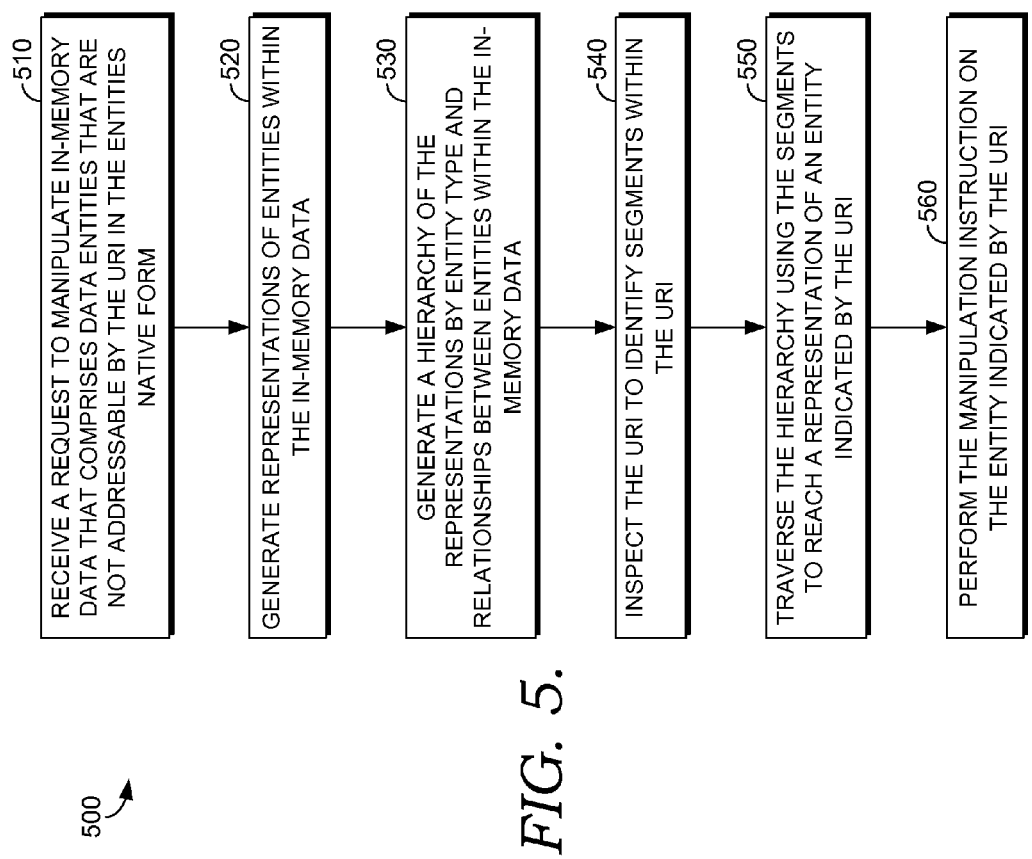
FIG. 5 is flow chart showing a method of manipulating in-memory data entities, in accordance with an embodiment of the present invention.

Turning now to FIG. 5, a method 500 of manipulating in-memory data entities is shown, in accordance with an embodiment of the present invention. The in-memory data entities may include, namespaces, collections, objects, and properties. At step 510, a request is received to manipulate entities within the in-memory storage that are not addressable by the URI in the entity's native form. The request may be defined as part of the HTTP protocol (and REST design pattern) and include: POST, PUT, GET, and DELETE which map to: Create, Read, Update and Delete—commonly referred to as CRUD.

At step 520, representations of entities within the in-memory data are generated. The representations are based on a state of the entities at a particular point in time. Once the representations are generated, the states may change apart from the representation within the in-memory storage. The representations themselves provide a fixed, addressable location that can then be mapped to the entities using the entities name. Throughout the specification, a URI may be described as being addressed to either an entity representation or just the entity for short. In either case, a representation is used to provide an addressable location.

At step 530, a hierarchy of the representations is generated. The hierarchy is based on entity type and relationships between entities within the in-memory data. For example objects within a collection are placed a level below the representation of the collection. The representation of the objects are placed in nodes that are attached to the collection representation. As mentioned, each level of the hierarchy may correspond with a URI segment. In that way, each entity representation within the hierarchy of representations may be addressed by a URI.

At step 540, the URI is inspected to identify segments within the URI. At step 550, the hierarchy is traversed using the segments to reach a representation of an entity indicated by the URI. In one embodiment, the hierarchy is traversed by a group of handlers passing the request down the hierarchy until the appropriate entity representation is identified. At step 560, the manipulation instruction within the request is performed on the entity indicated by the URI. As mentioned, the URI actually points to a representation of the entity, but the intent is to modify the entity that is associated with the representation, not the representation. A handler processing the request is able to locate the actual entity associated with the entity representation. In one embodiment, the handler uses unique identification information associated with the entity and the entity representation to locate the entity. By performing the manipulation, the actual entity may be changed. If the manipulation requested is only a read operation, then the entity may be unchanged. In one embodiment, once an entity is changed, the new state of the entity is propagated to all applications that are sharing the object.

Figure 6:
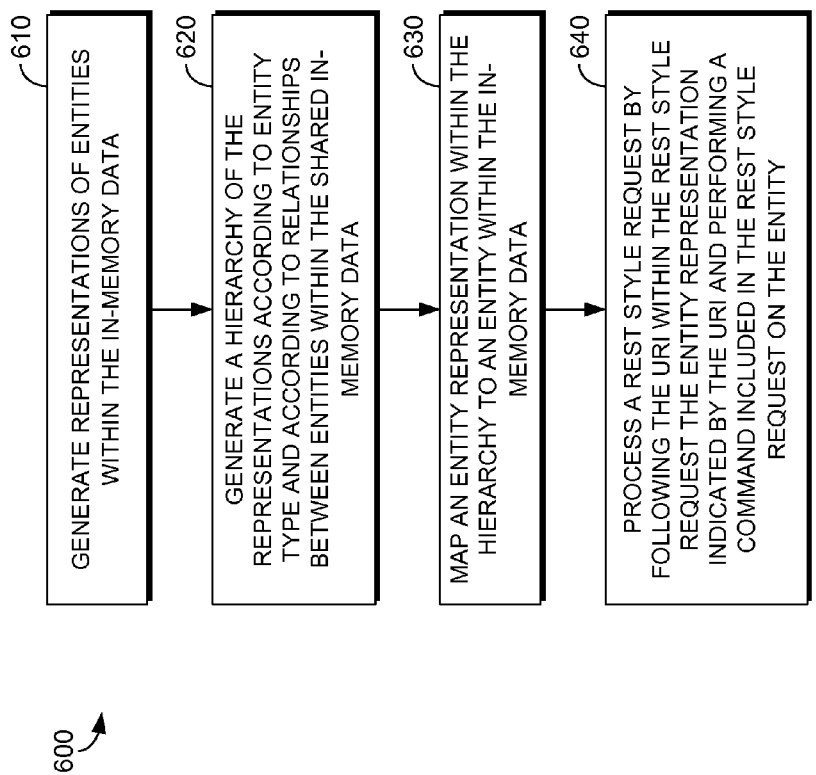
FIG. 6 is flow chart showing a method of manipulating in-memory data using Representational State Transfer ("REST") style commands, in accordance with an embodiment of the present invention.

Turning now to FIG. 6, a method 600 of manipulating in-memory data using representational state transfer ("REST") style commands is shown, in accordance with an embodiment of the present invention. At step 610, representations of entities within the in-memory data are generated. The representations have been described previously. At step 620, a hierarchy of the representations is generated according to entity type and according to relationships between the entities within the in-memory data. For example, objects within a collection may be subnodes of the collection node. At step 630, an entity representation within the hierarchy is mapped to an entity within the in-memory data. The mapping may occur by a handler once a request is determined to be addressed to the entity representation. In another embodiment, the mapping is maintained by the handlers in anticipation of receiving a request.

At step 640, a REST style request is processed by following the URI within the REST style request to a representation of the entity indicated by the URI and performing a command included in the REST style request on the corresponding entity. Different commands may be performed on different types of entities. For example, with reference to namespaces, a GET command that allows a list of all top-level objects in the namespace to be retrieved may be permissible. Similarly, a POST command that allows a new object or collection to be created within the namespace may be allowed. A PUT command may not be supported. A DELETE command allows the entire namespace to be deleted. In one embodiment, referencing particular objects within a collection are not supported. Similarly, replacing an entire namespace is also not supported.

With reference to collections, a GET, POST, PUT, or DELETE command is allowed in some embodiments of the present invention. Within collections, the GET command reads a list of objects in a collection. The POST command creates a new object in the collection. The PUT command creates or updates a collection. The delete command deletes the collection.

With reference to objects, a GET command, a POST command, a PUT command, and a DELETE command are allowed in one embodiment of the present invention. A GET command reads the current state of an object. The POST command creates a new property. The PUT command creates or updates an object. The DELETE command deletes an object.

With reference to the properties, a GET command, a PUT command, and a DELETE command are allowed in one embodiment of the present invention. A POST command may not be allowed for properties because there are no subordinate resources for properties within one embodiment of the present invention. However, if additional entities were subordinate to properties, then a POST command may be allowed. The GET command retrieves the current value of a property, the PUT command creates or updates the value of a property, and a delete command deletes a property.

Figure 7:
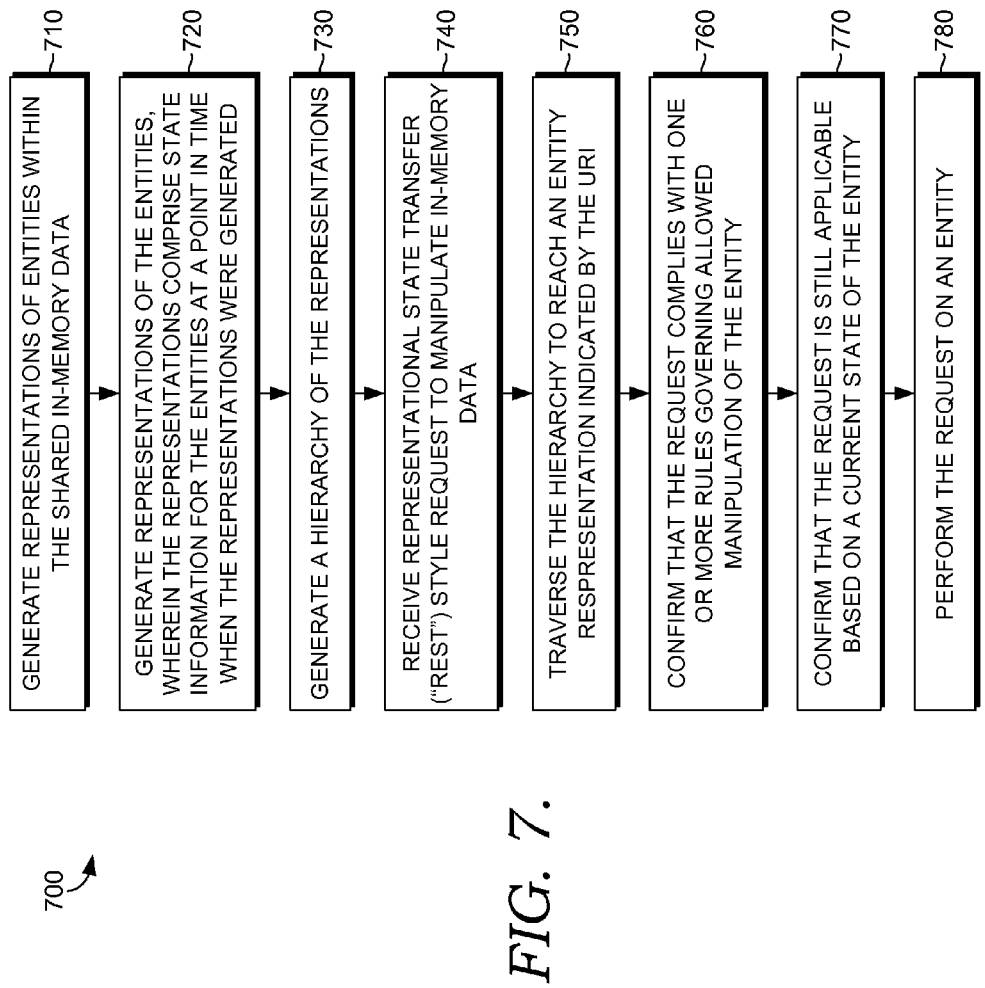
FIG. 7 is a flow chart showing a method of manipulating shared in-memory data entities that are actively being shared by multiple clients, in accordance with an embodiment of the present invention.

Turning now to FIG. 7, a method 700 of manipulating shared in-memory data entities that are actively being shared by multiple clients is shown, in accordance with an embodiment of the present invention. At step 710, representations of entities within the shared in-memory data are generated. The shared in-memory data service, similar to shared-object service 218 maintains a true copy of the entities within the shared in-memory data and communicates copies of the entities to client devices that maintain local copies of the entities. The local copies are acted on by applications on the client devices. The sharing service receives updates generated by the applications and updates the true copy of the entities and propagates the updates to each of the client devices actively sharing the entities. The entities as they are natively stored are not addressable by a uniform resource identifier.

At step 720, representations of the entities are generated. As mentioned previously, the representations of the entities are based on state information associated with the entities at a particular point in time. In another embodiment, the representations do not include any state information and simply represent relationships between entities at a particular point in time and provide a fixed location that is addressable by a URI.

At step 730, a hierarchy of representations is generated. At step 740, a representational state transfer ("REST") style request to manipulate the shared in-memory data is received. The request comprises a URI. The request may also specify a manipulation command to be performed on an entity corresponding to a representation addressed by the URI. An entity may be addressed by addressing the representation of the entity within the hierarchy. At step 750, the hierarchy is traversed to reach an entity representation indicated by the URI. At step 760, the request is confirmed to comply with one or more rules governing allowed manipulation of the entity. Some of these rules have been mentioned previously with reference to the type of actions that can be performed on various types of entities. Other rules, such as user access to the entity, may also be checked before performing an action.

At step 770, the request is confirmed to still be applicable based on a current state of the entity. As mentioned, since the entities are part of a shared in-memory data, the state of an entity could change between when a request was generated and the hierarchy was built. For example, a collection could be dissolved, or objects removed from a collection. In this case, an instruction to add or delete the collection may be moot, or not possible to follow based on the changes already made. In this case, the request may be denied. The new state of the objects may be communicated to a device that sent the request in response to a request that is not able to be performed because of the changed state of an entity. At step 780, the request is performed on the entity that is mapped to the entity representation.

Embodiments of the invention have been described to be illustrative rather than restrictive. It will be understood that certain features and subcombinations are of utility and may be employed without reference to other features and subcombinations. This is contemplated by and is within the scope of the claims.

The invention claimed is:

1. One or more computing devices having computer-executable instructions embodied thereon that when executed by the computing devices perform a method of manipulating in-memory data entities, the method comprising:
    receiving a Representational State Transfer ("REST") style request to manipulate in-memory data, wherein the request comprises a manipulation instruction and a uniform resource identifier ("URI"), and wherein entities within the in-memory data are not addressable by the URI because the entities do not maintain a fixed location within the in-memory data;
    generating representations of entities within the in-memory data, wherein a shared in-memory data service maintains a true copy of the entities within the shared in-memory data and communicates copies of the entities to client devices that maintain local copies of the entities that are acted on by one or more applications on the client devices, wherein the sharing service receives updates generated by the one or more applications, updates the true copy of the entities, and propagates the updates to each client device that is actively sharing the entities, and wherein the representations comprise state information for the entities at a point in time when the representations were generated;
    generating a hierarchy of the representations by entity-type and relationships between the entities within the in-memory data;
    inspecting the URI to identify segments within the URI;
    traversing the hierarchy using the segments to reach a representation of an entity indicated by the URI;
    confirming that the request complies with one or more rules governing allowed manipulation of the entity;
    confirming that the request is still applicable based on a current state of the entity; and
    performing the manipulation instruction on the entity indicated by the URI, wherein the entity is one of a namespace, which is in in a first level of the hierarchy, a collection, which is in a second level of the hierarchy, an object, which is in a third level of the hierarchy, and a property, which is in a fourth level of the hierarchy.

2. The one or more computing devices of claim 1, wherein the request is an HTTP Get request.

3. The one or more computing devices of claim 1, wherein the method further comprises determining the request is a Representational State Transfer ("REST") style request and routing the request to a REST web service.

4. The one or more computing devices of claim 1, wherein the method further comprises recursively invoking request handlers for each segment of the segments identified in the URI.

5. The one or more computing devices of claim 4, wherein the request handlers have responsibility for managing the in-memory data at a single level of the hierarchy.

6. The one or more computing devices of claim 5, wherein when an individual request handler determines that the URI includes a segment that is addressed to a hierarchal level below a level for which the individual request handler has responsibility, then the individual request handler communicates the request to a different handler with responsibility for managing entities associated with a lower hierarchal level.

7. The one or more computing devices of claim 5, wherein when an individual request handler determines that the URI does not include a segment that is addressed to a hierarchal level below a level for which the individual request handler has management responsibility, then the individual request handler validates the manipulation instruction to determine that the manipulation instruction is authorized.

8. The one or more computing devices of claim 6, wherein the method further comprises communicating to multiple clients that are sharing the in-memory data a state change in one or more entities produced by said performing the manipulation instruction.

9. A method of manipulating in-memory data using Representational State Transfer ("REST") style commands, the method comprising:
    generating representations of entities within the in-memory data, wherein a shared in-memory data service maintains a true copy of the entities within the shared in-memory data and communicates copies of the entities to client devices that maintain local copies of the entities that are acted on by one or more applications on the client devices, wherein the sharing service receives updates generated by the one or more applications, updates the true copy of the entities, and propagates the updates to each client device that is actively sharing the entities, and wherein the representations comprise state information for the entities at a point in time when the representations were generated, wherein entities within the in-memory data are not addressable by a URI because the entities do not maintain a fixed location within the in-memory data;

generating a hierarchy of the representations according to entity-type and according to relationships between entities within the in-memory data;

mapping an entity representation within the hierarchy to an entity within the in-memory data;

confirming that the request complies with one or more rules governing allowed manipulation of the entity;

confirming that the request is still applicable based on a current state of the entity; and processing a REST style request by following the URI within the REST style request to the entity representation indicated by the URI and performing a command included in the REST style request on the entity, wherein the entity is one of a namespace, which is in in a first level of the hierarchy, a collection, which is in a second level of the hierarchy, an object, which is in a third level of the hierarchy, and a property, which is in a fourth level of the hierarchy.

10. The method of claim 9, wherein the entity is a namespace, wherein the method further comprises authenticating that the command is authorized for operation on namespaces, wherein the following REST style commands are allowed on the namespaces, GET, POST, and DELETE, and wherein a PUT command is not authorized.

11. The method of claim 9, wherein the entity is a collection, wherein the method further comprises authenticating that the command is authorized for operation on collections, wherein the following REST style commands are allowed on namespaces, GET, POST, PUT, and DELETE.

12. The method of claim 9, wherein the entity is an object, wherein the method further comprises authenticating that the command is authorized for operation on objects, wherein the following commands are allowed on objects: reading a current state of the object, creating a new property for the object, creating a new object, and deleting an object.

13. The media of claim 12, wherein the following commands are not supported: referencing particular objects within a collection and replacing an entire namespace.

14. One or more computing devices having computer-executable instructions embodied thereon that when executed by the computing device perform a method of manipulating shared in-memory data entities that are actively being shared by multiple clients, the method comprising:
  generating representations of entities within the shared in-memory data, wherein a shared in-memory data service maintains a true copy of the entities within the shared in-memory data and communicates copies of the entities to client devices that maintain local copies of the entities that are acted on by one or more applications on the client devices, wherein the sharing service receives updates generated by the one or more applications, updates the true copy of the entities, and propagates the updates to each client device that is actively sharing the entities, and wherein the entities are not natively addressable by a uniform resource identifier ("URI") because the entities do not maintain a fixed location within the in-memory data,
  wherein the representations comprise state information for the entities at a point in time when the representations were generated;
  generating a hierarchy of the representations;
  receiving a Representational State Transfer ("REST") style request to manipulate the shared in-memory data, wherein the request comprises a URI;
  traversing the hierarchy to reach an entity representation indicated by the URI;
  confirming that the request complies with one or more rules governing allowed manipulation of the entity;
  confirming that the request is still applicable based on a current state of the entity; and
  performing the request on an entity mapped to the entity representation, wherein the entity is one of a namespace, which is in in a first level of the hierarchy, a collection, which is in a second level of the hierarchy, an object, which is in a third level of the hierarchy, and a property, which is in a fourth level of the hierarchy.

15. The one or more computing devices of claim 14, wherein the method further comprises communicating to the client devices a state change the entity produced by said performing the request on the entity.

16. The one or more computing devices of claim 14, wherein the method further comprises recursively invoking request handlers for each level of the hierarchy.

17. The one or more computing devices of claim 16, wherein when an individual request handler determines that the URI is addressed to a representation on a hierarchal level below a level for which the individual request handler has management responsibility then the individual request handler communicates the request to a different handler with management responsibility for a lower level.

* * * * *